United States Patent [19]

Mazzitelli

[11] Patent Number: 4,696,442
[45] Date of Patent: Sep. 29, 1987

[54] VORTEX GENERATORS FOR INLETS

[75] Inventor: Frederick Mazzitelli, Redmond, Wash.

[73] Assignee: The Boeing Company, Seattle, Wash.

[21] Appl. No.: 885,062

[22] Filed: Jul. 14, 1986

[51] Int. Cl.[4] ............................................. B64D 33/02
[52] U.S. Cl. .................................. 244/53 B; 244/199
[58] Field of Search ....................... 244/53 B, 199, 58; 137/15.1, 15.2; 138/39

[56] References Cited

U.S. PATENT DOCUMENTS 2,694,357  11/1954  Lee ..................................... 244/53 B
3,099,423  7/1963  Wilde et al. ....................... 244/53 B Primary Examiner—Galen Barefoot
Attorney, Agent, or Firm—H. Gus Hartmann; B. A. Donahue

[57] ABSTRACT

A pair of vortex generators are attached to the exterior surface of an aircraft and located forwardly of a flush inlet so as to effectively remove or reduce the thickness of a slower-moving boundary layer airflow ajdacent to the exterior aircraft surface and increase the mass airflow into the flush inlet. The pair of vortex generators induce higher mean total pressure airflow into the area between the vortex generators and downstream thereof and in front of to the flush inlet, thereby resulting in an increase in mass airflow into the flush inlet for a given inlet area. The vortex generators are of L or T-shape cross-section with the base of L or T-shape attached to the exterior surface of the aircraft; and in planform, the pair of vortex generators are angled rearwardly outwardly at a predetermined angle with respect to the direction of free stream airflow, or divergently, to generate counter-rotating vortices that trail outboard of the flush inlet and by the action of the rotational flow, induce more of the free stream airflow into the flush inlet. Generally, the free stream airflow is parallel to the exterior surface of the aircraft.

11 Claims, 6 Drawing Figures

VORTEX GENERATORS FOR INLETS

BACKGROUND OF THE INVENTION

One of the major airlines was experiencing air-conditioning failure problems with certain of their airplanes and in these particular cases, the failures generally occurred at high altitude and at high airspeed or cruise speed conditions; thereby, causing an altitude restriction to be imposed on the operation of the airplanes. The air-conditioning failure problem was traced to the heat exchanger unit which due to an insufficient cooling air mass flow passing therethrough was overheating and shutting down so that no conditioned air was entering the passenger compartment. The failures became more prevalent on a hot day at high altitude where the airflow into a flush inlet was less dense.

The intake efficiency of a flush inlet deteriorates with increasing thickness of the boundary layer passing over the surface in front of the flush inlet; and this decrease in efficiency is attributable to the ingestion of the slower moving, lower energy boundary layer flow into the flush inlet. A higher energy free stream airflow exists further out from the surface beyond the boundary layer. Therefore, an inlet that is flush with the surface may only receive a fraction of the total pressure i.e., static plus dynamic pressure, existing in the free stream airflow beyond the boundary layer.

An external inlet scoop was designed and tested to improve the flush inlet pressure recovery to acceptable levels and was found to perform very well under the test conditions. However adapting this option to the air-conditioning systems of existing airplanes would prove to be excessively costly and complex. In order to provide sufficient air mass flow into the inlet the height of the scoop was such that it extended into the free stream airflow which produced a drag penalty.

Other fluid flow modifying structures were designed and tested and the most cost effective solution to the air-conditioning failure problems, with the least impact on both the existing airplanes and those in production was to utilize the present invention, comprising a pair of vortex generators located ahead of the flush inlet of the heat exchanger unit.

SUMMARY OF THE INVENTION

The invention relates to fluid inlets opening into the surface of a body for ingesting fluid from a free stream moving relative to the body in which the inlet is located, and more particularly to a boundary layer fluid flow modifying structure for enhancing the fluid mass flow into fluid inlets, such as found on aircraft, ships and other type vehicles.

The invention provides a pair of vortex generators attached to the exterior surface of an aircraft and located forward of a flush-type inlet opening. The vortex generators are edge mounted flat plates or fin-like planer surfaces and are normal to the exterior surface of the aircraft to which they are attached. The vortex generators can be easily manufactured from T or L-shaped cross-sectional extrusions. In planform, they are angularly oriented or offset at an angle of between 15° to 20° to a longitudinal center line of a flush-type inlet opening so as to be rearwardly divergent for producing a spaced apart pair of counter-rotating vortices in their wake or trailing stream. In a front cross-sectional view of the vorticity pattern, their counter-rotating flow merges rotationally in a direction which impinges onto the surface area in front of the flush-type inlet opening.

A high pressure energy free stream fluid flow exists beyond a boundary layer of sluggish, viscous fluid flow of lower energy adjacent to or on the exterior surface of the airplane. The generated vortices coact with the boundary layer and the free stream fluid flow, to sweep the boundary layer fluid away from the exterior surface leading to the flush inlet thereby producing an aspiration action to pull the free stream fluid flow down to the surface and into the flush inlet. The action of the vortices, effectively removes or reduces the thickness of the slower-moving boundary layer airflow so that there is approximately a 25% to 30% increase in the air mass flow ingested into the flush inlet.

An object of the invention is to improve the efficiency of flush-type inlets, particularly when a thick, viscous boundary layer exists on the surface in front of a flush inlet.

Another object is to improve the efficiency of flush-type inlets by removing the boundary layer in front of flush-type inlets with a minimal increase in aerodynamic drag.

Another object is to provide vortex generating means for sweeping away the boundary layer from the surface in front of a flush-type inlet and creating an aspiration in the displaced boundary layer area for inducing free stream airflow down to the surface and into the opening of the flush-type inlet.

An advantage of the vortex generators of the invention is that they can be made from a T or L-shaped extrusion and easily retrofitted to existing inlets.

These and other features, objects and advantages of the invention will become apparent to those skilled in the art from the following detailed description and appended drawings.

DESCRIPTION OF THE PREFERRED EMBODIMENT

Figure 1:
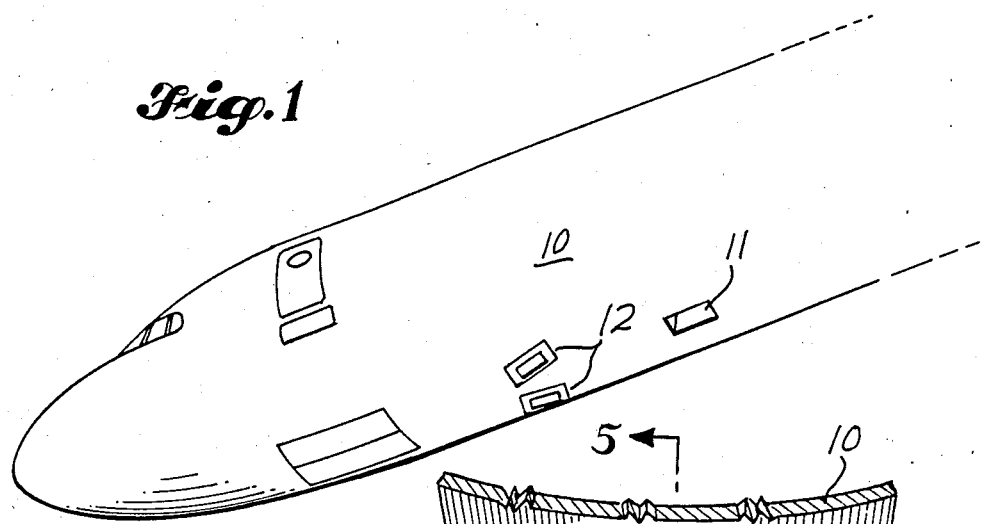
FIG. 1 is a perspective view of the undersurface of an aircraft fuselage having a flush-type inlet in which airflow into the inlet is enhanced by a pair of vortex generators positioned forward thereof.
Figure 2:
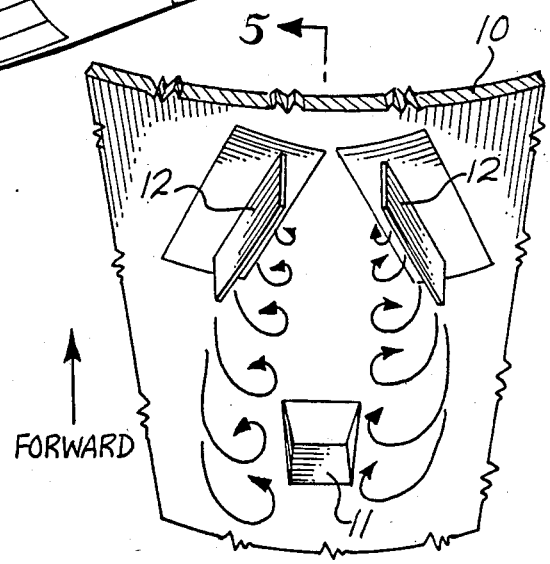
FIG. 2 is an enlarged front perspective view of the pair of vortex generators forward of an inlet as shown in FIG. 1.

FIGS. 1 and 2 are side and front perspective views respectively, of the undersurface of an airplane fuselage 10 depicting a rectangular opening or flush-type inlet 11 leading to an air-conditioning system. In front of the flush inlet 11 is the embodiment of the disclosed invention comprising a divergent pair of edge mounted flat plates or fins 12 which function as vortex generators, hereinafter referred to as "VG's" 12. The VG's 12 can be made from an extruded length of T or L-shaped cross-section and fixedly fastened to the undersurface of the fuselage 10. The planar surfaces of the VG's 12 extend outward from the surface of the fuselage 10 at an angle normal thereto and are of a height that extends approximately one-half the thickness of the boundary layer airflow. Also, the planer surfaces of the VG's 12 are aligned at an angle-of-attack with respect to the airflow direction of the boundary layer such that they produce a maximum lifting force on their outwardly extending planer surfaces; and this lifting force occurs within approximately one-half the thickness of the boundary layer. Further, this maximum lifting force functions to set up a vorticity within the thickness of the boundary layer. These vortices serve to sweep away the boundary layer on the surface in front of the flush inlet 11.

Figure 3:
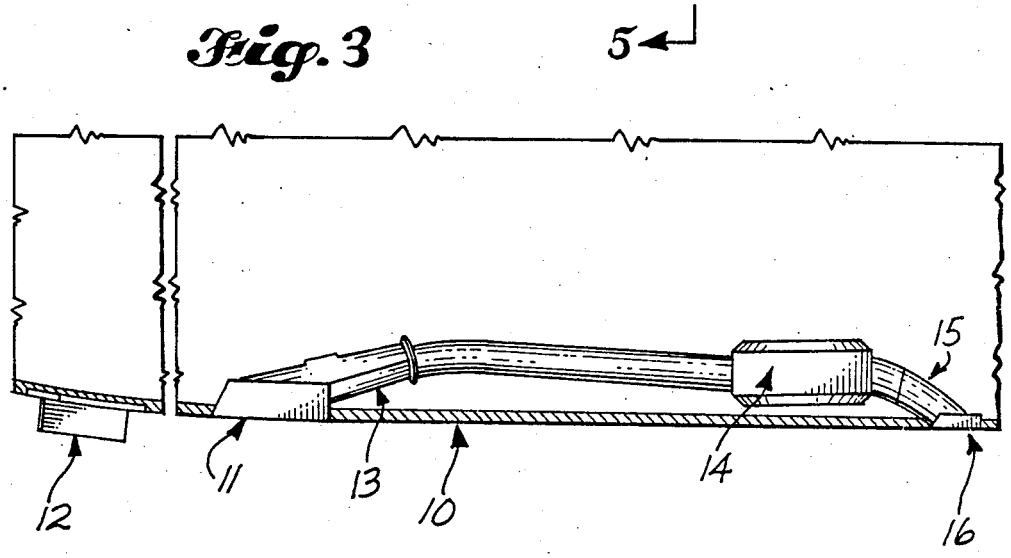
FIG. 3 is a sectional side view of FIG. 1 showing a schematic of an air-conditioning system incorporating vortex generators forward of a flush air inlet.

FIG. 3 is a schematic side elevational view of a unit of the air-conditioning system. The flush rectangular opening 11 of FIG. 1 functions as a air inlet for a diffusion duct 13 which leads to a heat exchanger 14 of an air-conditioning system. The heat exchanger 14 is a primary source for cooling the air-conditioning system. Engine bleed air (not shown) is taken from one of the air compression stages of a high-bypass turbofan engine and sent through the heat exchanger 14 of an air-conditioning system and then into a mix-bay (not shown) and into the passenger compartment of the airplane. The cooling air enters the intake duct 13 where it is diffused to pass through the heat exchanger and then it enters the exhaust duct 15 and is exhausted overboard through the exit 16.

Figure 4:
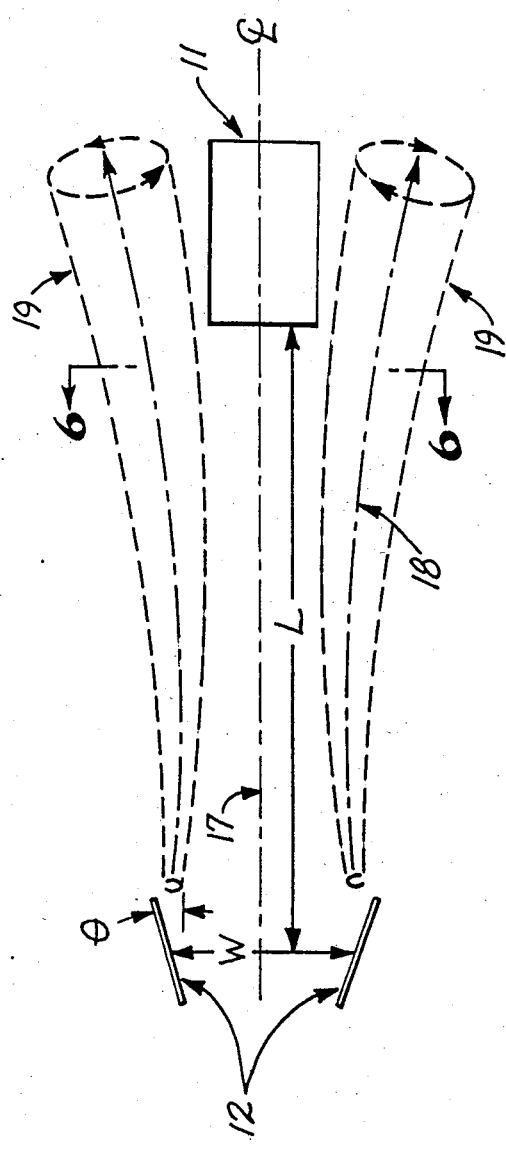
FIG. 4 is a bottom plan view of FIGS. 1–3, showing the relationship between the flush inlet and the set of vortex generators producing trailing vortices; and the direction of airflow in FIG. 4 is left-to-right.

FIG. 4 is a schematic, bottom plan view of FIGS. 1–3 depicting the relationship between the flush inlet 11 and the set of pair of VG's 12 positioned forward thereof relative to the direction of free stream airflow which is indicated in the figure as left-to-right. The pair of VG's 12 are symmetrically positioned, relative to the longitudinal center line 17 of the flush inlet 11, and set at a divergent angle "theta" for producing counter-rotating vortices. The VG's 12 are laterally spaced apart, as indicated by the dimension "W", symmetrically with respect to a longitudinal center line 17, such that the vortex cores 18, shown in dashed lines, eminating therefrom creates a pair of vorticity cones 19 that are diverted around or bypass the flush inlet opening 11 so that none of the vorticity flow is ingested into the inlet 11. The result is an improved inlet pressure recovery because there are no losses involved with ingesting the vortices.

Figure 5:
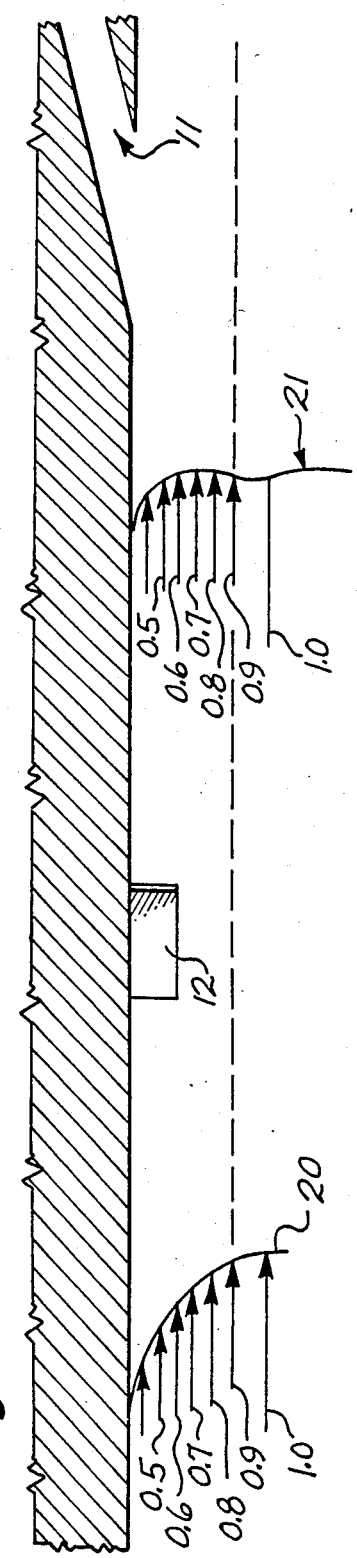
FIG. 5 is a side sectional schematic taken in the direction indicated by 5—5 on FIG. 2 depicting the boundary layer profile both before and after encountering the vortex generators.

FIG. 5 is a side sectional schematic taken in the direction indicated by 5—5 in FIG. 2 and depicts the change in the boundary layer airflow profile caused by the VG's 12. The onset boundary layer profile 20 (shown on the far left of the figure) is represented by a vertical series of isobaric or total pressure gradient lines as follows: the lowermost line of 1.0 represents free stream airflow pressure; the dashed horizontal line represents 0.9 total pressure recovery factor in the absence of the VG's 12; and the remaining series of lines represent total pressure gradient to the surface of the fuselage 10.

The efficiency of the flush-type inlet 11 deteriorates in proportion to the thickness of the boundary layer airflow of low pressure energy, viscous airflow in front of the flush inlet 11. The thickness of the boundary layer develops as the free stream air mass flows along the exterior surface of the fuselage 10 and increases in thickness with increasing distance from the nose of the fuselage. Within the thickness or dimensional height of the boundary layer, the velocity of the airflow decreases with decreasing distance from the surface 10 of the fuselage, such that the maximum free stream airflow velocity is represented as the 1.0 line and the airflow velocity diminishes toward the fuselage surface 10, as represented by the percentage decrease in the total pressure gradient lines.

As the onset boundary layer profile 20 approaches the VG's 12, the air mass flow is subjected to rotation which essentially induces the higher energy or free stream airflow, into the region between the VG's 12, normally representing the thickness of the boundary layer; therefore, there is an improvement in the pressure recovery factor or total pressure closer to the fuselage surface 10 and this improvement is represented by the boundary layer profile 21 which is ingested into the flush inlet 11. The total pressure recovery lines in the boundary layer profile 21, depict the improvement realized by the VG's 12; because, the pressure recovery lines between 0.9 and 1.0 which represent higher energy airflow, have been induced closer to the fuselage surface 10. Thereby, the airflow of higher total pressure or energy, is ingested into the flush inlet 11.

Without the VG's 12, the flush inlet 11 would receive the onset boundary layer profile 20 and thereby ingest the lowest energy airflow which is adjacent to the surface of the fuselage 10. This airflow adjacent to the fuselage surface 10 represents only a fraction of the total pressure in the free stream airflow that will enter the inlet duct 13 and this drop in total pressure in the inlet duct 13 will adversely affect the cooling capacity of the heat exchanger 14 causing the air-conditioning system to overload and shutdown.

Figure 6:
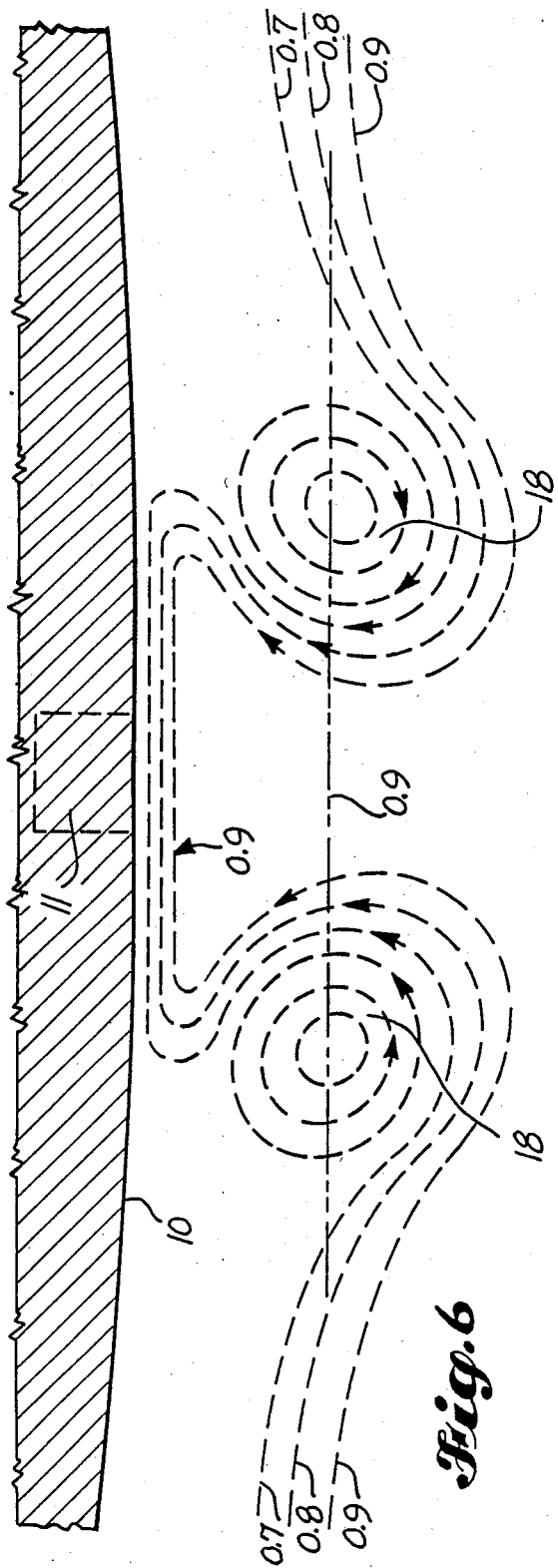
FIG. 6 is a rear cross-sectional view, taken in the direction indicated by 6—6 on FIG. 4, of the boundary layer profile prior to ingestion into the flush inlet.

FIG. 6 is a rear cross-sectional view taken in the direction indicated along 6—6 of FIG. 4. The dashed horizontal line indicates the 0.9 pressure recovery shown in FIG. 5 in the absence of the effect of the VG's 12. The counter-rotating vortices produced by the VG's 12, pick up the higher pressure energy airflow shown by the pressure gradient lines and carry it up closer to fuselage undersurface 10 so that there is consequently a pressure recovery improvement in the order of 25% to 30% directed into the flush inlet 11 which is located downstream of the VG's 12. In the absence of the VG's 12 the series of isobaric or pressure gradient lines would be relatively straight horizontally through the area.

In another aspect, the rotational flow produced by the VG's 12, sweeps out the lower energy boundary layer air in the area between them and creates a updraft which induces the higher energy air of the free stream airflow to come up the fuselage undersurface 10 and enter the flush inlet 11. By sweeping the boundary layer, between the two vortices, outwardly from the surface, actually results in a thicker boundary layer immediately adjacent to the outside of the vortices.

Ideally, the best location for an inlet on an airplane is right up on the nose of the fuselage where the boundary layer thickness is very thin or substantially nonexistent and impact air mass flow is directly injected into the inlet; however, a higher aerodynamic drag penalty is associated with this location for an inlet and this location may not be practical when all of the aircraft systems are integrated. For air inlets that are located aft of the nose section or near the aft end of an aircraft fuselage, the boundary layer on the exterior surface of the fuselage increases progressively from the nose section to the tail section and it becomes necessary to provide some means for either removing or penetrating the thick boundary layer that is developed on the surface, in order to provide an adequate air mass flow into an inlet.

Although the design of the VG's 12 is normally tailored for a specific cruise airspeed and altitude operating condition, they will also improve the pressure recovery of an inlet at essentially everywhere in the airplane's flight envelope.

Regarding the specific design and placement of the VG's 12 relative to the flush inlet 11: for the VG's 12 to be efficient, their height or span should be approximately one-half the total thickness of the boundary layer airflow and this can be determined by inflight pressure measurements or by aerodynamic analysis. In the present invention, the problem of insufficient air mass flow into the heat exchanger 14, shown in FIG. 3, occurred on a hot day at pressure altitudes of approximately 37,000 ft. and in level flight cruse airspeed; and under these operating conditions, the boundary layer thickness was determined to be approximately six inches; therefore, the VG's 12 were made three inches high.

Referring to FIG. 4, the offset angle "theta" from the longitudinal center line 17 of the flush inlet 11, is between 15° to 20°. The strength of the vortex is directly related to both: the angle-of-attack of the flat plate VG's 12 and the amount of side force or aerodynamic lift produced. If the angle-of-attack or the angle "theta" is too great, the airflow over the flat plate VG's 12 will separate in a manner similar to that of an airfoil approaching stall conditions; therefore, to produce a strong vortex without flow separation, the angle "theta" should be approximately 15° to 20°.

Although the VG's 12 are preferably constructed as a flat plate utilizing a T or L-shaped extrusion for ease of manufacture and least cost, they function in all respects similar to an aerodynamically designed airfoil at an angle-of-attack to the airstream. There should be no airflow separation on or over the surface of the VG's 12 because the strength of the vortices comes from the lift forces developed at the angle-of-attack setting of the flat plate VG's 12. It is desirable to produce the maximum lift forces possible from the VG's 12 without incurring airflow separation; therefore, the preferred angle-of-attack range is 15° to 20°, or more precisely the range of 12° to 25° as the limiting range; and this preferred range should be further conditioned to the airflow remaining attached to the VG's 12 for producing strong vortices eminating therefrom to propagate boundary layer removal downstream thereof, adjacent to the flush inlet 11, causing an inducement of the free stream airflow into the flush inlet 11.

It is possible, given the right aerodynamic environment, that the airflow may remain attached at angles-of-attack exceeding 20°, but eventually somewhere in the 20° to 30° range, which is not well defined, the airflow will separate on the VG's 12 and instead of producing a nice strong vorticity eminating from the VG's 12, the result will be a turbulent flow wake which will not be of any benefit as far as generating a strong vortex for directing the free stream airflow up into the inlet 11 and it would be drastically inefficient.

Another factor to be considered, is that the flat plate VG's 12 act as small aspect-ratio wings; so, the relationship between the chord length to its span or height, is also very important and this chord-to-span or aspect-ratio should be approximately 3 to 4, e.g., if the selected span or height of the VG's 12 is three inches, then the chord length would be between nine to twelve inches.

With respect to the distance that the VG's 12 are positioned ahead of the flush inlet 11, or the dimension "L" shown in FIG. 4. In the present invention, this distance "L", measured from about the mid-chord length of the VG's 12 to the leading edge of the flush inlet 11, is approximately ten times the span or height of the VG's 12, or thirty inches.

If the distance "L" is too short, the vortices will not have sufficient time to establish the flow pattern shown in the cross-sectional view of FIG. 6, before reaching the leading edge of the flush inlet 11; and if the distance "L" is too great, the vortex could expand and dissipate prior to reaching the flush inlet 11, resulting in greatly reduced effectivity.

With respect to the distance between the two VG's 12 i.e., the dimension "W" shown in FIG. 4, which is measured between the mid-chord lengths of the VG's 12, should be approximately three to five times the height of the VG's 12 e.g., if the height is three inches then the space between them should be about nine to fifteen inches.

If the VG's 12 are positioned too close together, the vortices will induce a velocity upon each other, referring to FIG. 6 and in a manner similar to magnetic lines of force, they will repel each other; and if the repulsion force is great enough, the vortices will rapidly spread apart, referring to FIG. 4, so that they would never get back to or alongside of the flush inlet 11 for improving the boundary layer conditions in the area between them as shown in FIG. 6.

Another parameter to be considered is that the VG's 12 should be spaced far enough apart, referring to dimension "W" in FIG. 4, that the vortices are not ingested into the flush inlet 11; this would not be efficient because the rotational flow energy would tend to reduce the mass airflow which reaches the inlet 11. Further, if the VG's 12 are spaced too far apart, they would not be effective in improving the boundary layer in the area between them, before it reached the flush inlet 11; because, the existing boundary layer thickness upstream of the VG's 12 would take over again in the area between them.

Besides improving the cooling air mass flow into a flush inlet of an Environmental Control System, this invention can be applied any time that a performance improvement is desired on an inlet and when cost, structures and aerodynamic drag impact are to be minimized. A potential application might include airplane derivatives where higher cooling demands are envisioned but structural changes are to be minimized.

Although the detailed description of this embodiment is directed to use on an airplane for enhancing the flow of air into a flush-type inlet that feeds air to a heat exchanger unit of an air-conditioning system, nevertheless it will be appreciated that the principles of this invention are broadly applicable to improving the intake efficiency of any type of fluid inlet which serves to ingest fluid from a stream moving along the surface of a body in which the inlet is located. Further, it will be evident that various changes and modifications may be made in the aerodynamic design and construction of the vortex generating elements without departing from the scope of this invention.

What is claimed is defined as follows:

1. Inlet fluid flow inducing means, comprising: a pair of fin-like elements mounted upstream to the direction of free stream fluid flow over an inlet; said pair of fin-like elements being spaced apart normal to the direction of the free stream fluid flow for producing a pair of trailing vortex filaments therefrom; said pair of trailing vortex filaments, in cross-section, having adjacent counter-rotating vortices that merge in a similar-directional fluid flow into a downstream area between the fin-like elements and the inlet; said pair of fin-like elements being optimally spaced apart normal to the direction of the free stream fluid flow to insure that the pair of trailing vortex filaments produced therefrom, are divergently swept apart to pass astride the inlet in order that no vortices are ingested by the inlet; thereby, inducing a higher mean total pressure in the fluid mass flow ingested by the inlet.

2. Inlet fluid flow inducing means as set forth in claim 1, wherein each of said fin-like elements project a predetermined distance into a boundary layer, generally formed between the free stream fluid and the inlet, for coacting therewith to generate a single trailing vortex filament that passes astride the inlet and is not ingested therein.

3. Inlet fluid flow inducing means as set forth in claim 1, wherein each of said fin-like elements has a chordwise dimension in a direction approximately parallel to the free stream fluid flow and has a spanwise dimension in a direction approximately perpendicular to the free stream fluid flow and the ratio of said chordwise dimension to said spanwise dimension, being in the approximate range of three-to-four.

4. Inlet fluid flow inducing means as set forth in claim 3, wherein each of said fin-like elements has its chordline set at a predetermined angle-of-incidence with respect to a longitudinal fluid inlet center line parallel to the direction of free stream fluid flow for producing an angle-of-attack in the range of approximately fifteen to twenty degrees; whereby, a single vortex filament is produced trailing downstream from each of said fin-like elements.

5. Inlet fluid flow inducing means as set forth in claim 3, wherein each of said fin-like elements is located upstream of the fluid inlet, at a distance measured from the mid-chord dimension of said fin-like elements to the leading edge of the fluid inlet, of approximately ten times the spanwise dimension of said fin-like elements; whereby, the pair of trailing counter-rotating vortices pass astride the flush inlet and are not ingested therein.

6. In an aircraft, means for inducing an air mass flow into an inlet mounted flush with an exterior surface of the aircraft, comprising: a pair of vortex generating elements mounted on the exterior surface of the aircraft upstream of the flush inlet and being spaced apart normal to the direction of air mass flow over the flush inlet for producing a pair of trailing vortex filaments therefrom; said pair of trailing vortex filaments, in cross-section, having adjacent counter-rotating vortices that merge in a similar-directional fluid flow into a downstream area between the vortex generating elements and the flush inlet, to effectively sweep away lower energy boundary layer airflow from the exterior surface in front of the flush inlet, by the counter-rotating forces created by the merging air of trailing vortex filaments; said pair of vortex generating elements being optimally spaced apart, normal to the direction of air mass flow, to insure that the pair of trailing vortex filaments produced therefrom, are divergently swept apart to pass astride the flush inlet in order that no vortices are ingested by the flush inlet; thereby, inducing a higher mean total pressure in the air mass flow ingested by the flush inlet.

7. Inlet airflow inducing means as set forth in claim 6, wherein each of said vortex generating elements project a predetermined perpendicular distance from the exterior surface, for protruding into approximately mid-thickness of a boundary layer formed at cruise airspeed and altitude of the aircraft, to coact with the boundary layer and generate a single trailing vortex filament, from each of said vortex generating elements, that passes astride the flush inlet and is not ingested therein.

8. Inlet airflow inducing means as set forth in claim 6, wherein each of said vortex generating elements has a chordwise dimension in a direction approximately parallel to the exterior surface and has a spanwise dimension in a direction approximately perpendicular to the exterior surface, and the ratio of said chordwise dimension to said spanwise dimension, being in the approximate range of three-to-four.

9. Inlet airflow inducing means as set forth in claim 6, wherein each of said vortex generating elements has an average chord length taken parallel to the exterior surface and has an average span length taken perpendicular to the exterior surface; wherein, the ratio of average chord length to the average span length is in the approximate range of three-to-four.

10. Inlet airflow inducing means as set forth in claim 9, wherein each of said vortex generating elements has its chordline set at a predetermined angle-of-incidence with respect to a longitudinal inlet center line; whereby, the angle-of-attack of said vortex generating elements, relative to the direction of free stream airflow at cruise airspeed and attitude of the aircraft, is in the range of approximately fifteen to twenty degrees for producing a single vortex filament trailing downstream thereof.

11. Inlet airflow inducing means as set forth in claim 9, wherein each of said vortex generating elements being located upstream of the flush inlet, a distance measured from the mid-chord length of said vortex generating elements to the leading edge of the flush inlet, of approximately ten times the spanwise dimension of said vortex generating elements; whereby, the pair of trailing counter-rotating vortices pass astride the flush inlet and are not ingested therein.

* * * * *

UNITED STATES PATENT AND TRADEMARK OFFICE
CERTIFICATE OF CORRECTION

PATENT NO. : 4,696,442

DATED : September 29, 1987

INVENTOR(S) : Frederick Mazzitelli

It is certified that error appears in the above—identified patent and that said Letters Patent is hereby corrected as shown below:

Column 3, line 5, "planar" should be --planer--.

Column 3, line 37, "of" should be --or--.

Column 4, line 54, insert --to-- after "up".

Column 8, line 6, "air" should be --pair--.

In the drawings, sheet 2, Fig. 5, left and right of boundary layer profile 21, apply the reference numeral 0.9 to the dashed total pressure gradient. In Fig. 5, the gradient lines of profile 21 should be renumbered 0.85, 0.90, 0.92, 0.94, 0.96, and 1.0, starting from the uppermost line. The lowermost gradient line reference numeral remains 1.0.

Signed and Sealed this

Tenth Day of October, 1989

Attest:

DONALD J. QUIGG

Attesting Officer

Commissioner of Patents and Trademarks